(No Model.)

C. TERROT.
CHAIN GEARING.

No. 563,096. Patented June 30, 1896.

UNITED STATES PATENT OFFICE.

CHARLES TERROT, OF DIJON, FRANCE.

CHAIN-GEARING.

SPECIFICATION forming part of Letters Patent No. 563,096, dated June 30, 1896.

Application filed January 7, 1896. Serial No. 574,607. (No model.)

*To all whom it may concern:*

Be it known that I, CHARLES TERROT, engineer, residing at Dijon, in the Department of Côte-d'Or and Republic of France, have invented certain new and useful improvements in systems of chain-gearing for transmitting motion to all mechanical transmissions employing chains, especially applicate to velocipedes and such like vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to a new and improved system of chain-gear whereby motion may be transmitted with greater softness, ease, and regularity than by any system hitherto in use so far as I am aware.

In carrying out my invention I proceed to construct the endless chain as follows: I take two cheeks or flanks which I place side by side or parallel to each other, and these I connect by rivets or pins or rollers inserted toward their ends. The couple of cheeks or flanks thus arranged are connected to a correspondingly-arranged couple of cheeks or flanks by means of peculiarly-shaped links so pivoted as to enable a continuous flexible chain to be produced. These links are provided on their inner circumference with semicircular projections for the purpose presently described. In gear with the chain thus produced I propose to use a wheel provided with a deep-flanged groove all round its circumference. In this groove are arranged a number of traverse-rivets carrying suitable rollers, this circumferential distance apart of each roller corresponding approximately with the length of the connecting-links of the chain.

Figure 1:
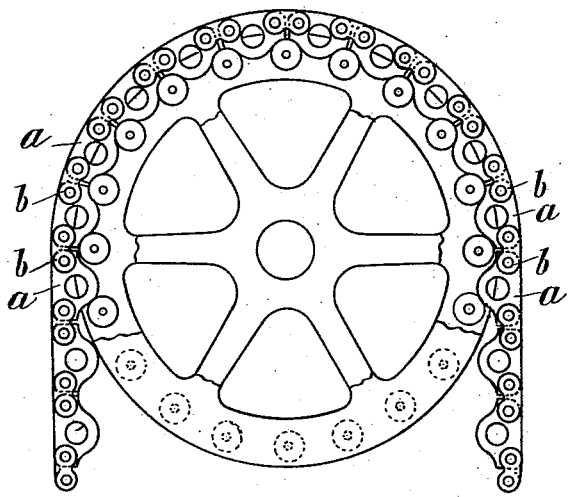
Figure 2:
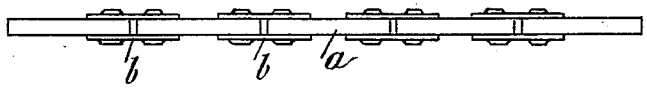

Figure 1 represents in elevation my improved chain and wheel in gear, a portion of the near flange being removed to show the contact of the connecting-links and the rollers. This view is to scale about half-size for pedal-wheel of an ordinary bicycle. Fig. 2 represents plan of the outer circumference of the chain, full size for bicycle.

$a$ $a$ are the peculiarly-shaped links connecting the couples of cheeks or flanks $b$ $b$ by rivets, as shown. $c$ $c$ are the rollers carried on the rivets $d$ $d$, arranged all round the deep-flanged groove and spaced so as to enable the peculiarly-shaped links to gear with same.

Apertures are formed in the links for lightness of construction.

It is obvious that by this arrangement of chain-gear the effect is to produce a rolling contact between the chain-links and the rollers of the wheel whereby the friction hitherto existing between the ordinary endless chain and the teeth of the ordinary wheel is entirely obviated, and a considerable softness of motion obtained, together with a saving of power transmitted.

Having now particularly described and ascertained the nature of my said invention and in what manner the same is to be performed, I declare that what I claim is—

The combination with a sprocket-wheel having a deep peripheral groove containing a series of transverse rollers, of a driving-chain composed of links having semicircular projections adapted to enter between said rollers, and short connecting-cheeks pivoted on each side of the links at each end thereof, substantially as described.

In testimony whereof I affix my signature in presence of two witnesses.

CHARLES TERROT.

Witnesses:
  CLYDE SHROPSHIRE,
  L. CRESPIN.